United States Patent [19]
Pearson

[11] 3,965,629
[45] June 29, 1976

[54] CONDUIT APPARATUS

[75] Inventor: James R. Pearson, Houston, Tex.

[73] Assignees: Lawrence A. Bresan; James R. Pearson, both of Houston, Tex.; a part interest to each

[22] Filed: Sept. 11, 1974

[21] Appl. No.: 505,043

[52] U.S. Cl. .................................. 52/221; 52/220; 85/83; 52/704
[51] Int. Cl.² .......................... E04B 5/48; E04B 1/38
[58] Field of Search ............... 52/221, 28, 34, 220; 285/158, 215; 174/151, 61, 62, 48, 49, 138 R, 152 G, 152 R; 85/80, 5 R, 83, 8.3; 175/210

[56] References Cited
UNITED STATES PATENTS

| | | | |
|---|---|---|---|
| 824,250 | 6/1906 | Knapp | 175/210 |
| 1,760,618 | 5/1930 | Woodhead | 174/152 G |
| 2,738,892 | 3/1956 | Wiesman | 52/221 |
| 2,958,548 | 11/1960 | DeVienne et al. | 285/215 |
| 3,177,284 | 4/1965 | Stuessei | 52/221 |
| 3,199,398 | 8/1965 | Weisz | 85/83 |
| 3,380,208 | 4/1968 | Cook | 52/704 |
| 3,395,243 | 7/1968 | Kelly | 174/48 |
| 3,483,787 | 12/1969 | Saunders | 85/5 R |

FOREIGN PATENTS OR APPLICATIONS

| | | | |
|---|---|---|---|
| 488,796 | 5/1930 | Germany | 174/152.2 |
| 477,879 | 1/1938 | United Kingdom | 174/152.2 |

Primary Examiner—Ernest R. Purser
Assistant Examiner—Robert Farber
Attorney, Agent, or Firm—Torres & Berryhill

[57] ABSTRACT

Conduit apparatus providing a fire resistant passageway, for an elongate member such as wire, through a hole in a barrier such as a floor, wall or the like may comprise: a tubular core member through the interior of which the elongate member may pass; friction surfaces surrounding the exterior of the core member for frictional and sealing engagement with the barrier hole; and a seal member engageable with the interior of the core member and the exterior of the elongate member.

8 Claims, 1 Drawing Figure

U.S. Patent June 29, 1976 3,965,629
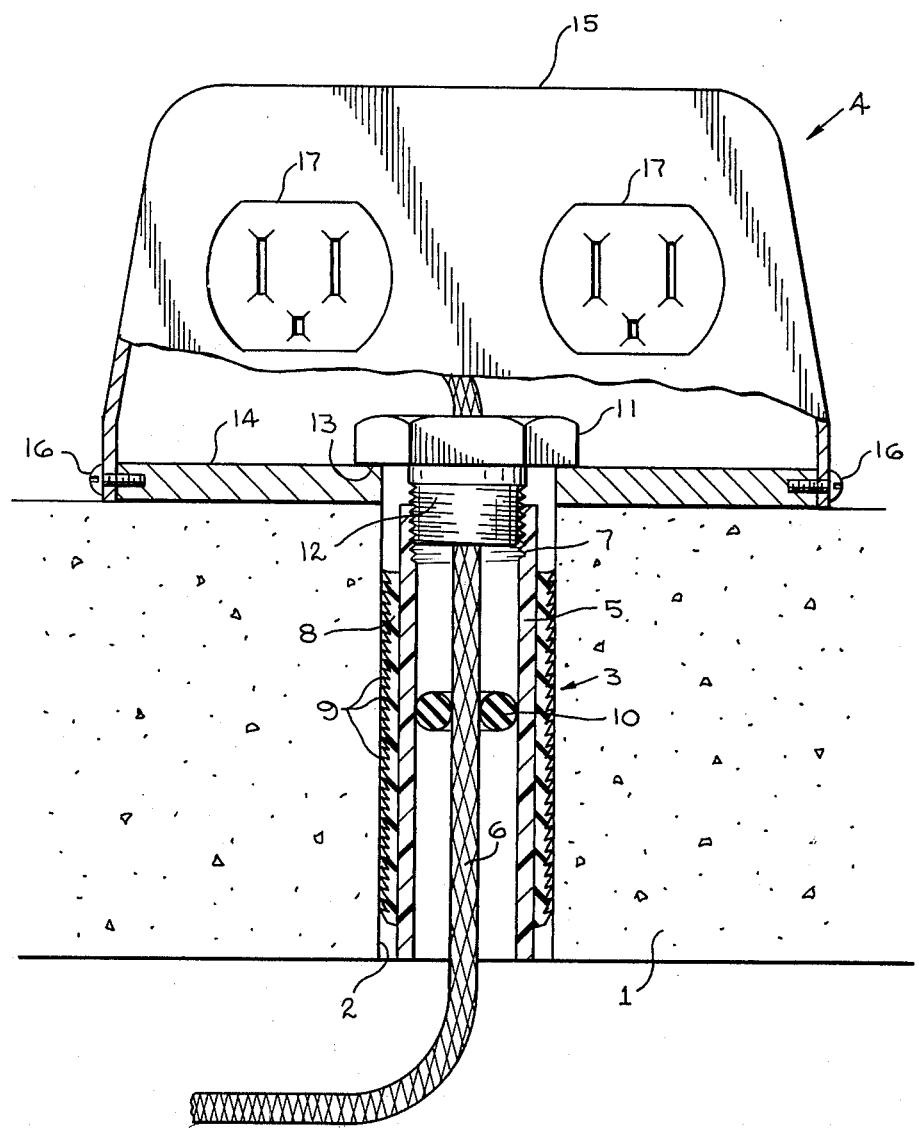

CONDUIT APPARATUS

BACKGROUND OF THE INVENTION

1. Field of the Invention

The present invention pertains to conduit apparatus. More particularly, the present invention pertains to conduit apparatus for providing a fire resistant passageway through a hole in a barrier such as a floor, wall or the like. The invention specifically pertains to such conduit apparatus suitable for installation of power and communication wiring.

2. Description of the Prior Art

In the construction of buildings and other facilities, it is often necessary to install wiring, piping and other materials for communication with opposite sides of barriers such as floors, walls or the like. For example, it may be necessary to provide power and communication wiring between the different levels of a multiple story building.

Most modern buildings are constructed with concrete floor slabs between levels through which such wiring must be passed. Usually, a hole is drilled through the concrete slab for passage of the wire. Preferably some sort of conduit is provided in the hole for passage of the wire and perhaps attachment to an electrical junction or service box. Such conduits are usually anchored to the floor slab by nuts or other attachment members that require manipulation on each side of the slab. The need for manipulation on each side of the slab creates an increase in manpower and cost of installation. Some examples of such conduits and fittings may be seen in U.S. Pat. Nos. 3,177,284 and 3,380,208.

Most modern construction codes and insurance considerations require that these conduits be supplied with some sort of a seal to provide a barrier to fire so as to prevent the spread of fire from one floor to another. There have been recent developments in conduits or fittings which meet these fire resistant specifications. However, these conduits or fittings also require manipulation from both sides of the floor or other barrier. Furthermore, the designs therefor require a relatively large hole through the barrier for placement therein. The larger the hole required, the more expensive drilling equipment is required and the more time is required. This naturally increases the cost of construction.

SUMMARY OF THE INVENTION

The present invention provides conduit apparatus for creating a fire resistant passageway through a hole in a barrier and may comprise: a tubular core member, through the interior of which the wire or other elongate member may pass; friction surfaces surrounding the exterior of the core member for frictional and sealing engagement with the barrier hole; and a seal member engageable with the interior of the core member and the exterior of the wire. The configuration of the friction surfaces are such as to create less resistance to longitudinal movement through the hole in one direction than in the opposite direction so that the conduit apparatus may be inserted into the hole with substantially less force than would be necessary to remove it from the hole once installed. Thus, the conduit apparatus may be installed from one side of the barrier by simply applying the necessary force to push it into the hole.

Furthermore, an anchoring nut may be provided for engagement with the core member to place a force on the friction surfaces in a direction opposite to the direction of installation so as to aid in anchoring the apparatus in the barrier hole. The anchoring member may also be used to attach a service or junction box or any other auxiliary equipment.

The unique design of the conduit apparatus also permits its installation in a substantially smaller hole than the conduit apparatus of the prior art. Consequently, the expense of providing a hole through the barrier is substantially reduced. One feature which contributes to the reduction in the required hole size is the design for passage of a single wire, cable, or other elongate member. The fittings of the prior art are usually designed to pass both power and communication wiring, requiring a barrier therebetween and increasing the size of the fitting. With the conduit apparatus of the present invention, a separate conduit may be provided for power and communication wiring at a cheaper cost than the combination units of the prior art. This is particularly true in cases where it is not necessary to have both power and communication wiring. With fittings of the prior art, the cost of installation is still the same, whereas with the present invention, the cost is cut in half.

Thus the conduit apparatus of the present invention provides a much cheaper unit to manufacture and install. In addition, it provides a fire resistant barrier which is superior to any conduit apparatus of the prior art. Many other objects and advantages of the invention will be apparent from the description which follows in conjunction with the drawing.

BRIEF DESCRIPTION OF THE DRAWING

The drawing is an elevation view, partially in section, of conduit apparatus, according to a preferred embodiment of the invention, shown installed in a floor slab and accommodating a service box.

DESCRIPTION OF A PREFERRED EMBODIMENT

Referring to the drawing, there is shown a floor slab 1 having a hole 2 drilled therethrough for receiving the conduit apparatus of the invention, generally represented at 3. A service box 4, part of which has been broken away, is also shown attached adjacent the floor 1 by the conduit apparatus 3.

The conduit apparatus 3 may comprise a tubular core member or portion 5 through which a wire 6 or other elongate member may pass. The core member 5 is relatively rigid and may be made of any suitable material, i.e., fiberglass, plastic, steel, aluminum, other metals, etc. It may be provided with internal threads 7, or other connection means, the purpose of which will be described hereafter.

Surrounding the core member 5 is friction means 8 which may be formed with and of the same material as the core member 5. In the alternative, it may be made of another material bonded thereto. It is preferable that the material of the friction surfaces be relatively resilient. It should also be fire-resistant and materials contemplated for this use are: silicone rubber, fluorocarbon resins, hydrated calcium sulfate, asbestos, asbestos-impregnated rubber, thermolag and nylon type materials.

The configuration of the surface of the friction means 8 is such as to create less resistance to longitudinal movement through the hole in one direction (down as shown in the drawing) than in the opposite direction (up as shown in the drawing) so that the apparatus may be inserted into the hole 2 with substantially less force than necessary to remove it from the hole. This configuration may comprise radial projections 9, the surfaces facing in one direction (down as shown in the drawing) of which are tapered for less frictional resistance to longitudinal movement than the frictional resistance created to longitudinal movement in the opposite direction (up as shown in the drawing) by the surfaces of the radial projections 9 facing in the opposite or up direction.

An interior seal member 10 is provided for sealing engagement with the interior of the core member and the exterior of the wire 6. This seal may take the form of an O-ring and should also be made of a fire resistant material, such as those used for the friction means 8.

An anchoring nut 11, having threads 12 thereon for mutual engagement with the core member threads 7, is provided to anchor the conduit assembly 3 in the hole 2, as will be more fully explained hereafter. In addition, the anchoring nut 11 is provided with shoulders 13 which may serve to affix a base plate 14 of the service box 4 adjacent the slab 1. The service box 4 is provided with a cover 15 attached to the base plate 14 by fastening means such as screws 16 and with electrical outlets 17 to which the wire 6 is connected.

STATEMENT OF OPERATION

To install the conduit apparatus 3 of the present invention, a hole 2 is drilled through the floor 1. Then one end of the conduit apparatus 3 is placed in the upper opening of the hole 2 and a force applied thereto causing the apparatus to frictionally and sealingly engage the hole 2 for disposition as shown in the drawing. As previously described, the design of the frictional means 8, permits installation with a relatively small amount of force. However, greater force is required to remove the apparatus 3 from the hole.

Prior to, or following, installation of the conduit apparatus in the hole 2, a seal member 10 may be placed around the wire 6 and the wire and seal 10 then pulled through the interior of the core member 5 so that the seal 10 is disposed as shown in the drawing, sealingly engaging both core member 5 and the wire 6.

To assure that the apparatus is firmly anchored in the hole 2, the anchoring nut 11 is threadedly engaged with core threads 7. As this is done, the base plate 14 may be placed adjacent the floor so that the anchoring nut 11 will also anchor the base plate 14. As the anchoring nut 11 is tightened, an upwardly directed force is applied to the conduit apparatus 3, and consequently, the frictional means 8. This upwardly directed force is resisted by the upwardly directed faces of the radial projections 9 causing the apparatus to be tightly wedged in hole 2. Thus the frictional means 8 serves not only to provide a fire resistant barrier seal but it also serves to anchor the conduit apparatus 3 and the base plate 14 to the floor slab 1.

CONCLUSION

The resulting conduit apparatus of the present invention is far superior to the prior art in many ways. It is cheaper to manufacture, less expensive to install and superior in performance.

Although the conduit apparatus of the present invention is primarily designed for wiring installations, it is not so limited. It can be used where it is desired to extend any elongate member through barriers such as floors, walls and the like. For example, it might be used for passage of piping, tubing or the like.

Although only one embodiment of the invention has been described herein, many variations can be made by those skilled in the art without departing from the spirit of the invention. It is therefore intended that the scope of the invention be limited only by the claims which follow.

I claim:

1. Conduit apparatus providing a fire resistant passageway, or an elongate member, through a hole in a barrier such as a floor, wall or the like comprising:
   tubular core means through the interior of which said elongate member may pass;
   friction means surrounding the exterior of said core means for frictional and sealing engagement with said hole through said barrier, said friction means comprising radial projections, substantially surrounding said core for an interference fit with said hole and having surfaces facing in one direction, relative to the axis of said hole, which are tapered for less frictional resistance to longitudinal movement in said one direction than the frictional resistance created to longitudinal movement in the opposite direction by the surfaces of said radial projections facing in the opposite direction so that said apparatus may be inserted into said hole in said one direction with substantially less force than necessary to remove said apparatus in said opposite direction; and
   seal means engageable with said interior of said core means and the exterior of said elongate member.

2. Conduit apparatus as set forth in claim 1 including anchoring means, having a passage through which said elongate member may pass, engageable with said core means for placing a force on said friction means in said opposite direction to anchor said apparatus in said barrier hole.

3. Conduit apparatus as set forth in claim 2 with said anchoring means comprising means engageable with an electrical fixture for affixing said fixture adjacent said barrier hole for communication with said core means interior.

4. Conduit apparatus as set forth in claim 2 in which said core means and said anchoring means are provided with cooperating threads by which said engagement and placing said force on said friction means may be effected.

5. Conduit apparatus as set forth in claim 1 in which said friction means is of a resilient material selected from one of the following fire resistant materials: silicone rubber, fluorocarbon resin, hydrated calcium sulfate, asbestos, thermolag.

6. In combination with a barrier such as a floor, wall or the like, having a hole therein, conduit apparatus comprising:
   tubular core means;
   friction means surrounding the exterior of said core means for an interference fit and frictional and sealing engagement with said hole through said barrier, the configuration of the surface of said friction means being such as to create less resistance to longitudinal movement through said hole in one direction than in the opposite direction so that said apparatus may be inserted into said hole in said one direction with substantially less force than necessary to remove said apparatus from said hole in said opposite direction; and anchoring means engageable with said core means for placing a force on said friction means in said opposite direction to anchor said apparatus in said barrier hole.

7. The combination of claim 6 including an elongate member passing through the interior of said core and anchoring means and fire resistant seal means sealingly engaging said core means interior and the exterior of said elongate member.

8. The combination of claim 7 in which said hole completely penetrates said barrier and in which both said friction means and said seal means are of fire resistant materials, so that said combination creates a fireproof seal between the opposite sides of said barrier.

* * * * *

UNITED STATES PATENT AND TRADEMARK OFFICE
CERTIFICATE OF CORRECTION

PATENT NO. : 3,965,629
DATED : June 29, 1976
INVENTOR(S) : James R. Pearson

It is certified that error appears in the above-identified patent and that said Letters Patent are hereby corrected as shown below:

Column 4, line 12, "or" should be -- for --.

Signed and Sealed this

Seventh Day of September 1976

[SEAL]

Attest:

RUTH C. MASON
*Attesting Officer*

C. MARSHALL DANN
*Commissioner of Patents and Trademarks*